United States Patent
Lee et al.

(10) Patent No.: US 7,516,259 B2
(45) Date of Patent: *Apr. 7, 2009

(54) COMBINED ENGINE FOR VIDEO AND GRAPHICS PROCESSING

(75) Inventors: Enoch Lee, Sunnyvale, CA (US); Li Sha, San Jose, CA (US); Shuhua Xiang, Fremont, CA (US)

(73) Assignee: Micronas USA, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/123,282

(22) Filed: May 19, 2008

(65) Prior Publication Data

US 2008/0222332 A1 Sep. 11, 2008

Related U.S. Application Data

(63) Continuation of application No. 11/259,558, filed on Oct. 25, 2005, now Pat. No. 7,380,036.

(60) Provisional application No. 60/713,506, filed on Aug. 31, 2005.

(51) Int. Cl.
 G06F 13/14 (2006.01)
 G06T 1/20 (2006.01)
 G06T 1/00 (2006.01)
 G06F 13/36 (2006.01)
(52) U.S. Cl. .................... 710/240; 345/506; 345/522
(58) Field of Classification Search .............. 710/240
 See application file for complete search history.

(56) References Cited

U.S. PATENT DOCUMENTS

| | | | | |
|---|---|---|---|---|
| 5,243,447 A | * | 9/1993 | Bodenkamp et al. | 345/629 |
| 5,432,900 A | * | 7/1995 | Rhodes et al. | 715/202 |
| 5,598,525 A | * | 1/1997 | Nally et al. | 345/546 |
| 5,899,575 A | * | 5/1999 | Okayama et al. | 386/46 |
| 5,923,385 A | * | 7/1999 | Mills et al. | 348/715 |
| 5,943,064 A | * | 8/1999 | Hong | 345/546 |
| 6,078,339 A | * | 6/2000 | Meinerth et al. | 345/522 |
| 6,507,293 B2 | * | 1/2003 | Deeley et al. | 341/67 |
| 6,526,583 B1 | * | 2/2003 | Auld et al. | 725/139 |
| 6,621,499 B1 | * | 9/2003 | Callway | 345/629 |
| 2004/0130558 A1 | * | 7/2004 | MacInnis et al. | 345/629 |
| 2004/0257369 A1 | * | 12/2004 | Fang | 345/501 |
| 2005/0248590 A1 | * | 11/2005 | Tian et al. | 345/660 |

* cited by examiner

*Primary Examiner*—Paul R Myers
*Assistant Examiner*—Ryan M Stiglic
(74) *Attorney, Agent, or Firm*—Mayer Brown LLP

(57) ABSTRACT

The system includes an arbiter, a combined engine, a frame buffer, and a display processing unit. The arbiter provides three input channels: a first channel for graphics, a second channel for video and a third channel for processor. The arbiter performs prioritization and arbitration between the video and graphics and processor requests sent to the system. The arbiter has three output ports coupled to the combined engine. The combined engine is a hardware engine capable of processing either video data or graphics data. The output of the combined engine is provided to the frame buffer for the storage of pixel data. The output of the frame buffer is coupled to a display processing unit that renders the pixel data for display.

3 Claims, 5 Drawing Sheets

COMBINED ENGINE FOR VIDEO AND GRAPHICS PROCESSING

CROSS-REFERENCES TO RELATED APPLICATIONS

The present application claims priority under 35 U.S.C. § 119(e) to U.S. Provisional Patent Application No. 60/713,506, filed on Aug. 31, 2005, entitled "BLITTER ENGINE AND ARCHITECTURE FOR IN LOOP FILTER" which is incorporated by reference in its entirety. This application is a continuation of U.S. Ser. No. 11/259,558 filed Oct. 25, 2005, and issued on May 27, 2008 as U.S. Pat. No. 7,380,036B2.

BACKGROUND OF THE INVENTION

1. Field of the Invention

The present invention relates to systems and methods for processing video and graphics. In particular, the present invention relates to a system and methods that can process both video and graphics.

2. Description of the Background Art

The processing of video data and graphics data is often performed by a graphics processing unit added to a computer system. These graphic processing units are very efficient at manipulating and displaying computer graphics, and their highly-parallel structure makes them more effective than typical Central Processing Units (CPUs) for a range of complex algorithms that are computationally expensive. A graphics processing unit implements a number of graphics primitive operations in a way that makes running them much faster than drawing directly to the screen with the host CPU. The most common operations for early 2D computer graphics include the BitBLT operation, usually in special hardware called a "blitter", and operations for drawing rectangles, triangles, circles and arcs. Originally, graphics processing units processed only graphics but increased capability have been added to allow them to process video data as well. More recent graphics processing units support 3D computer graphics and typically include digital video-related functions as well.

FIG. 1 illustrates a conventional prior art graphics processing system 100. The prior art system 100 includes several graphics engines 102, a video processing unit 104, a frame buffer 106 and a display processing unit 108. Such systems 100 typically include a first input port coupled to a signal line 120 to receive graphics data, a second input port coupled to signal line 122 to receive video data an output provided on signal line 124. The graphics engines 102 include multiple processing paths and units such as for processing legacy graphics data format, 2D graphics and 3D graphics. The graphic engines 102 are typically separate graphics engines, one for each type of graphics processing. The output of the graphics engines 102 is coupled to the frame buffer 106 to store pixel data. The video processing unit 104 is coupled to signal line 104 and is a conventional processor for manipulating video data and generating pixels. The output of the video processing unit 104 is coupled to the frame buffer 106 to store pixel data. The frame buffer 106 holds the graphics information for one frame or picture and consists of color values for every pixel (point that can be displayed) on the screen. The frame buffer 106 can also store off-screen data. The frame buffer 106 is coupled to the display processing unit 108 for providing pixel data. The display processing unit 108 in turn renders the pixels to create the video data output.

One problem in the prior art is performing both video processing and graphics processing. Each has different requirements that affect prioritization and arbitration of requests and processing. The typical prior art approach is to provide redundant logic for processing legacy graphics, 2D graphics, 3D graphics and video data thereby greatly increase the amount of area required for such an integrated circuit. Thus, such an approach greatly increases the die size and manufacturing costs.

Therefore, what is needed is an apparatus for processing both video and graphics that overcomes the limitations and problems of the prior art.

SUMMARY OF THE INVENTION

The present invention overcomes the deficiencies and limitations of the prior art by providing a combined video and graphics processing unit. In one embodiment, the system comprises: an arbiter, a combined engine, a frame buffer, and a display processing unit. The arbiter advantageously provides three input channels: a first channel for graphics commands, a second channel for video commands and a third channel commands from a processor. The arbiter performs prioritization and arbitration between the video, graphics and processor requests sent to the system. The arbiter has three output ports coupled to the combined engine. The combined engine is a hardware engine capable of processing either video data or graphics data. This is particularly advantageous when the system is constructed as an integrated circuit because it greatly reduces the area required for image processing logic Whether it be graphics or video. The output of the combined engine is provided to the frame buffer for the storage of pixel data. The output of the frame buffer is coupled to a display processing unit that renders the pixel data for display.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
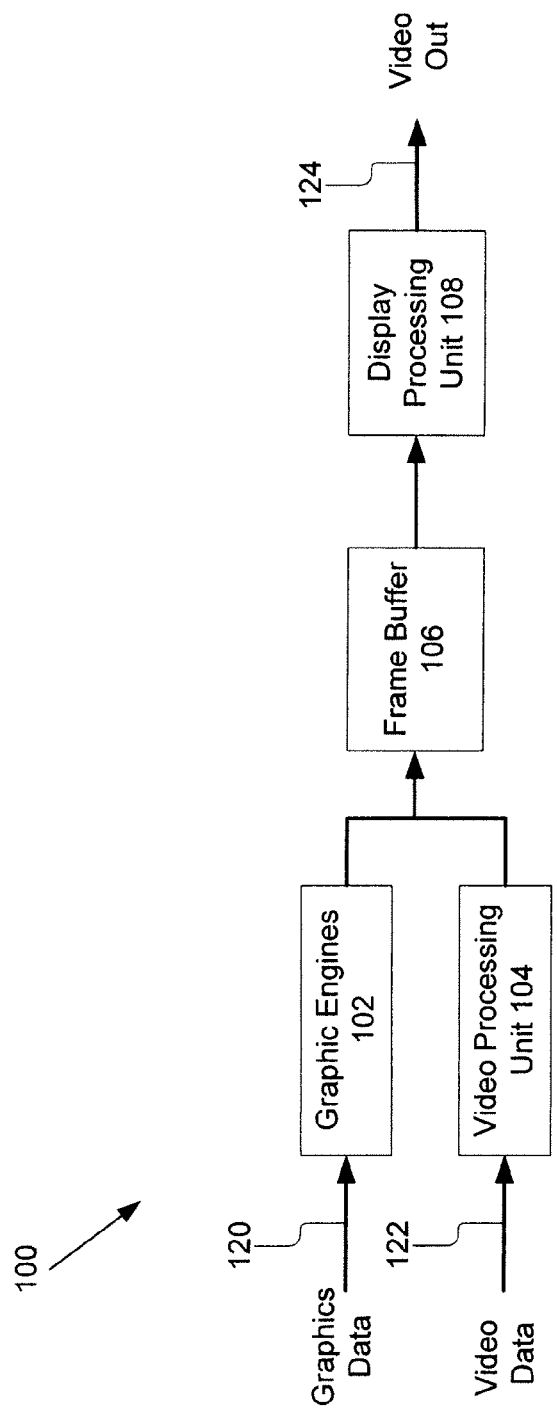
FIG. 1 is a block diagram of a prior art system for processing video and graphics.

A system for processing graphics and video are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. However, the present invention applies to any type of processor that has the ability to process video and graphics data in multiple formats.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Figure 2:
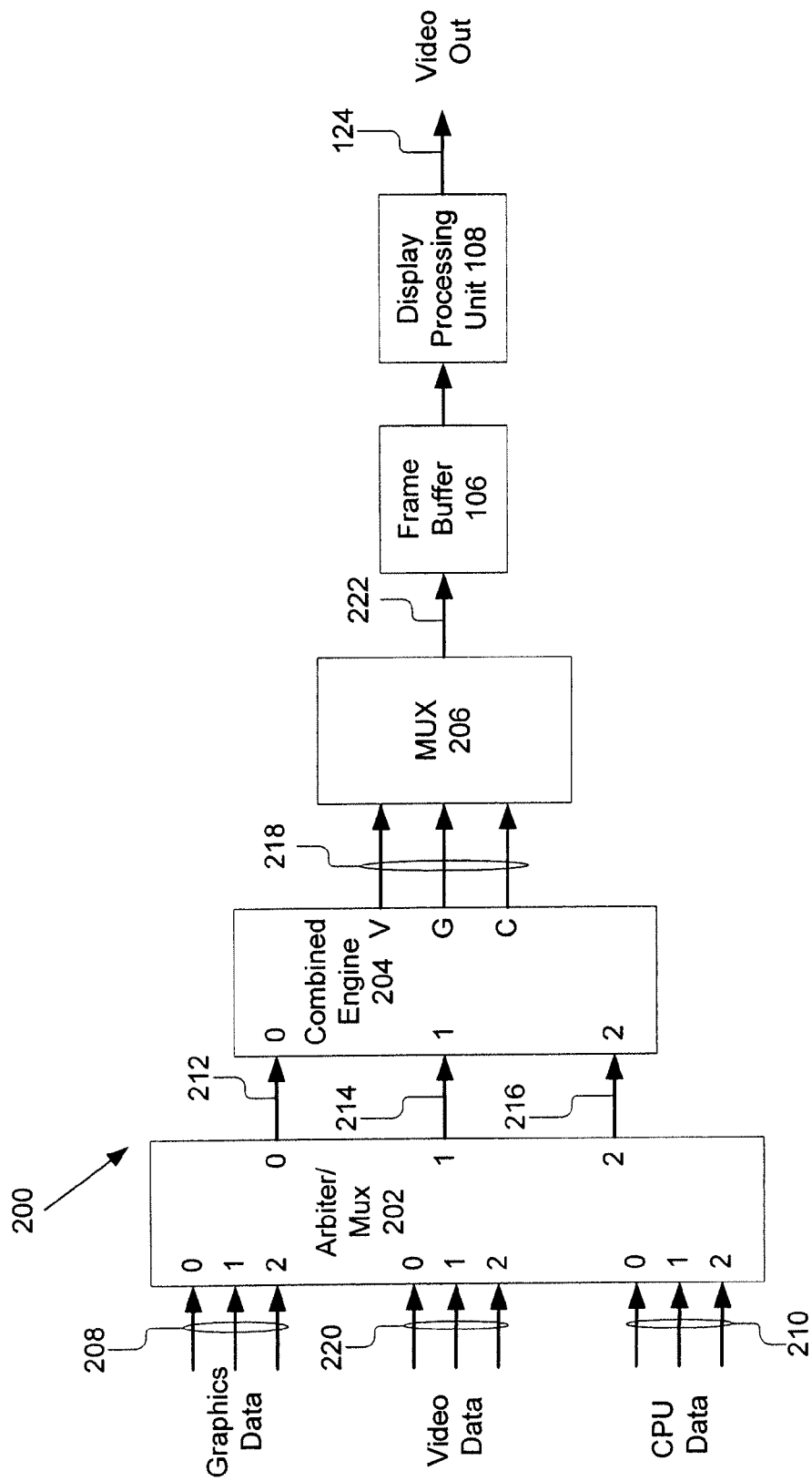
FIG. 2 is a block diagram of an embodiment of the data paths for a system for processing video and graphics including the combined engine of the present invention.

Referring now to FIG. 2, an embodiment of the data paths for system 200 for processing video and graphics of the present invention is shown. In this first embodiment, the system 200 comprises: an arbiter 202, a combined engine 204, a multiplexer 206, a frame buffer 106, and a display processing unit 124.

The arbiter 202 advantageously provides three input channels for data: a first channel for graphics data has three ports, a second channel for video data has three ports, and a third channel for data from a processor for single tile processing has three ports. The channels are coupled to signal lines 208, 220 and 210 to receive the graphics data, video data and CPU data, respectively. The arbiter 202 performs prioritization and arbitration between the video, graphics and CPU requests sent to the system 200. The arbiter 202 also multiplexes the inputs received at the nine input ports to provide the data in a format that the combined engine 204 can process, whether in a graphics data format or a video data format. The arbiter 202 in one embodiment performs a 9-to-3 multiplexing function. The arbiter 202 is more specifically described below with reference to FIGS. 3 and 5. The arbiter 202 has three output ports coupled to the combined engine 204.

The combined engine 204 is a hardware engine capable of processing either video data or graphics data. This is particularly advantageous when the system 200 is constructed as an integrated circuit because it greatly reduces the area required for image processing logic whether it be graphics or video. The combined engine 204 is particularly advantageous because it uses the same engine to process video and graphics data. The combined engine 204 is described in detail below with reference to FIG. 4. The combined engine 204 provides a significant hardware savings while satisfying the latency and bandwidth requirements by using the advanced arbitration scheme implemented by the arbiter 202 and the instruction set described below. The combined engine 204 has a plurality of inputs coupled by signal lines 212, 214 and 216 to respective outputs of the arbiter 202. The combined engine 204 generates pixel data at its output that is provided on signal lines 218 on a video, graphics or CPU channel to the multiplexer 206 for storage in the frame buffer 106.

The multiplexer 206 is preferably a 3-to-1 multiplexer and is coupled to the outputs of the combined engine. The output of the multiplexer 206 is coupled by signal line 222 to the input to the frame buffer. In an alternate embodiment, the multiplexer 206 is not needed if there are three frame buffers each dedicated for a channel. In such a case, each of the three output of the combined engine is coupled by a signal line to its respective frame buffer for the storage of data therein.

The frame buffer 106 holds the graphics information for one frame or picture and consists of color values for every pixel (point that can be displayed) on the screen. The frame buffer 106 also stores off-screen data. The frame buffer 106 is a conventional type of memory such as DRAM or SRAM. The frame buffer 106 may be a single or dual port memory. The frame buffer 106 is also coupled to the display processing unit 108 for providing pixel data.

The display processing unit 108 retrieves pixel data from the frame buffer and converts the pixel data into video data that can be used by a display device to render an image. The display processing unit 108 is of a conventional type.

Figure 3:
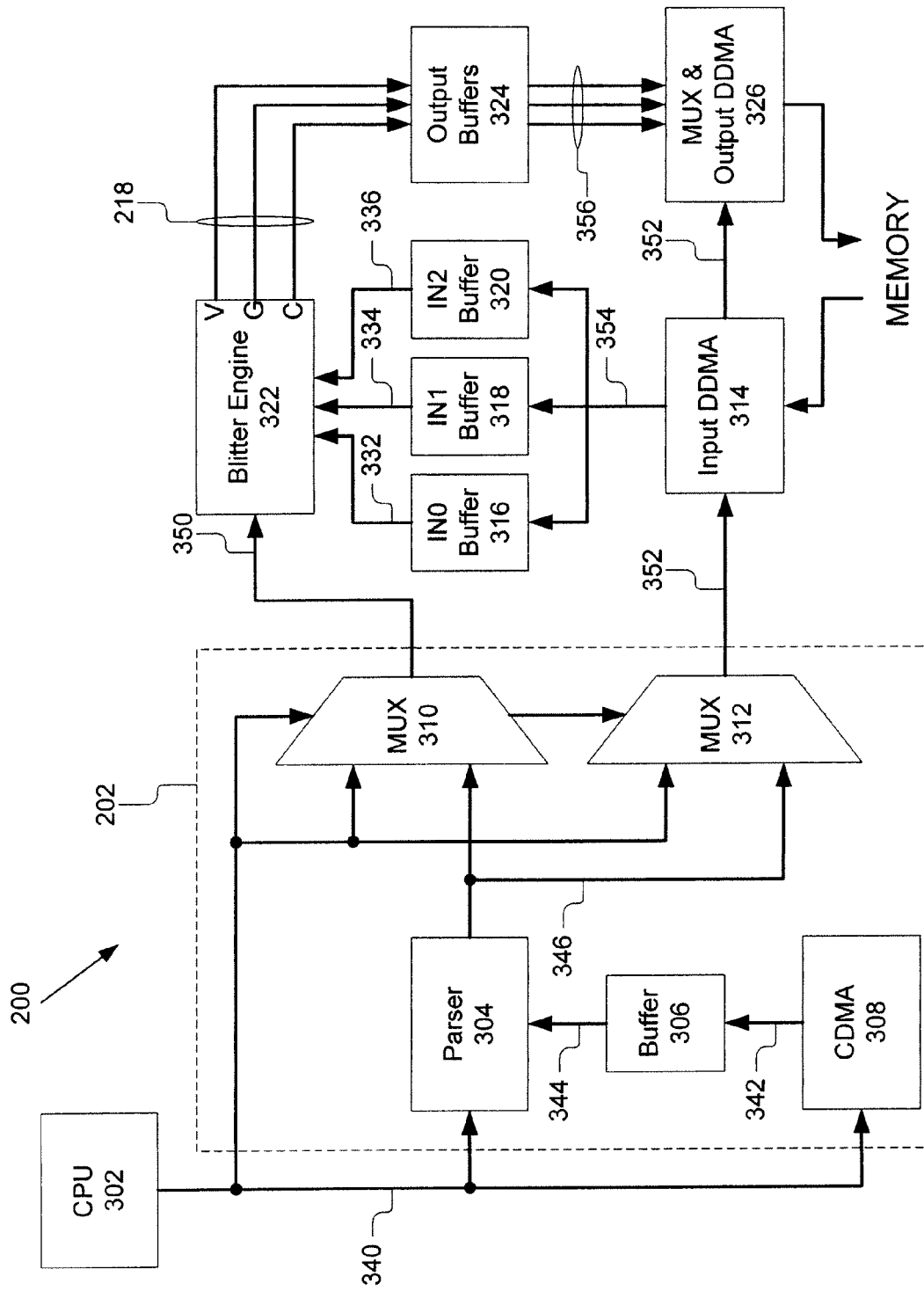
FIG. 3 is a block diagram of an embodiment of the data and control paths for the system for processing video and graphics including the combined engine of the present invention.

Referring now to FIG. 3, an embodiment of the data and control paths for the system 300 for processing video and graphics of the present invention is shown. In this embodiment, the system 300 comprises: a Central Processing Unit (CPU) 302, the arbiter 202, an input Data Direct Memory Access (DMA) 314, an output DDMA 326, a plurality of buffers 316, 318, 320, 324 and a blitter engine 322. The arbiter 202 further comprises a first multiplexer 310, a second multiplexer 312, a parser 304, a buffer 306 and a command DMA 308.

The CPU 302 is a conventional type and is coupled to the arbiter 202 by a signal bus 340. The CPU 302 provides data and commands to the arbiter 202. The arbiter 202 is responsive to the commands and retrieves data for processing by the blitter engine 322. The CPU 302 processes data signals and may comprise various computing architectures including a complex instruction set computer (CISC) architecture, a reduced instruction set computer (RISC) architecture, or an architecture implementing a combination of instruction sets. Although only a single CPU 302 is shown in FIG. 3, multiple processors may be included. In the one embodiment, the CPU 302 is an on chip application processor.

As noted above and shown in FIG. 3, the arbiter 202 comprises the first multiplexer 310, the second multiplexer 312, the parser 304, the buffer 306 and the command DMA 308.

The first multiplexer 310 is a 2:1 multiplexer and provides an output on signal line 350 to the blitter engine 322. The first input of the first multiplexer 310 is coupled to a portion of bus 340 to receive instructions from the CPU 302. The second input of the first multiplexer 310 is coupled to signal line 346 to receive the output of the parser 304. The first multiplexer 310 provides instructions from either the CPU 302 or the parser 304 in response to a control signal applied to the control input of the multiplexer 310. The control input of the multiplexer 310 is coupled to bus 340 to receive control signals from the CPU 302.

The second multiplexer 312 is also a 2:1 multiplexer and provides an output on signal line 352 to the data DMA 314. The first input of the second multiplexer 312 is coupled to a portion of bus 340 to receive instructions from the CPU 302. The second input of the second multiplexer 312 is coupled to signal line 346 to receive the output of the parser 304. The second multiplexer 312 provides data from either the CPU 302 or the parser 304 in response to a control signal applied to the control input of the multiplexer 312. The control input of the multiplexer 312 is coupled to bus 340 to receive control signals from the CPU 302. Both multiplexers 310, 312 advantageously provide a path by which the CPU 302 can directly provide instructions to the blitter engine 322 and data DMA 314 such as for debugging purposes.

The parser 304 has a plurality of inputs and an output. The parser 304 is coupled to bus 340 to receive command words from the CPU 302. The parser 304 also has an input coupled to the output of the buffer 306 to receive instructions retrieved from memory (510 in FIG. 5). The parser 304 uses the command words to do arbitration as will be described in more detail below. The parser 304 provides the command on line 346 so they may be applied to the blitter engine 322 and the data DMA 314.

The buffer 306 is a conventional FIFO buffer used to store command and control information such as instructions. The buffer 306 has an input and an output. The input of the buffer 306 is coupled by signal line 342 to the output of the command DMA 308 and the output of the buffer 306 is coupled by signal line 344 to the input of the parser 306. The buffer 306 is used to store commands provided by the command DMA 308 such as through a burst read direct memory access.

The command DMA 308 is a direct memory access controller that allows reading and writing of the memory (510 in FIG. 5) independent of the CPU 302. The command DMA 308 allows for communication with the memory at a different speed than the CPU 302 and to avoid CPU interrupts. The command DMA 308 essentially copies a block of memory to the buffer 306. While the CPU 302 initiates the transfer, the transfer itself is performed by the command DMA 308. The CPU 302 is coupled to the command DMA 308 for this purpose.

The input DDMA 314 has a control input coupled to line 352 to receive signals from either the CPU 302 or the parser 304. The signal on line 352 is used to select the channel of data retrieved by the input DDMA 314 from memory (510 in FIG. 5). The input DDMA 314 is similar to the command DMA 308 and is a direct memory access controller that allows reading of the memory (510 in FIG. 5) independent of the CPU 302. The input DDMA 314 is used to retrieve data for processing by the blitter engine 322. The output of the data DMA 314 is coupled to the input buffers 316, 318, 320 by signal line 354.

The output DDMA 326 has an input coupled to the output of buffers 324 for storing processed data back to memory (not shown). The output DDMA 326 has a control input coupled to line 352 to receive signals from either the CPU 302 or the parser 304. The signal on line 352 is used to select the channel of data sent by the output DDMA 326 from the blitter engine 322 to the memory (510 in FIG. 5). The output DDMA 326 also includes a 3-to-1 multiplexer for selecting one of three data channels. The output DDMA 326 is similar to the command DMA 308 and is a direct memory access controller that allows reading of the memory (510 in FIG. 5) independent of the CPU 302. The output DDMA 326 is used to send data processed by the blitter engine 322 back to memory. The input of the output DDMA 326 is coupled to the output buffers 326 by signal lines 356.

The plurality of buffers 316, 318 and 320 are input buffers, one for each channel or port. The fourth buffer 324 is an output buffer. Each of the input buffers 316, 318 and 320 is preferably a FIFO buffer that acts as a queue. The input buffers 316, 318 and 320 each have an input coupled to the data DMA 314 and an output coupled to blitter engine 322. The first buffer 316 is preferably provided to input video data, the second buffer 318 is provided to input graphics data and the third buffer 320 is provided for data for alpha blending. The output buffer 324 has an input coupled to the output of the blitter engine 322 by signal line 218 and is used to temporarily store the data before use by the data DMA 314. The output of the buffer 324 is coupled by signal line 356 to the input of the data DMA 314.

The blitter engine 322 processes either video data or graphics data. This is particularly advantageous since it reduces the circuit area required for the blitter engine 322. The blitter engine 322 is capable of performing a variety of graphics operations as detailed in Appendix A, and as will be described with reference to FIG. 4 below. The blitter engine 322 provides a significant hardware savings while satisfying the latency and bandwidth requirements by using the advanced arbitration scheme implemented by the arbiter 202. The blitter engine 322 has a plurality of inputs coupled to signal lines 332, 334 and 336 coupled to outputs of respective input buffers 316, 318, 320. The blitter engine 322 generates pixel data at its output that is provided on signal line 218 and stored in the frame buffer 106. While the output of the blitter engine 322 is shown as three separate signal lines, one for each channel, those skilled in the art will recognize that the blitter engine 322 may have a single output coupled to three buffers in the output buffers 324 for storage of the data selectively depending the channel corresponding to the data being output by the blitter engine 322.

Figure 4:
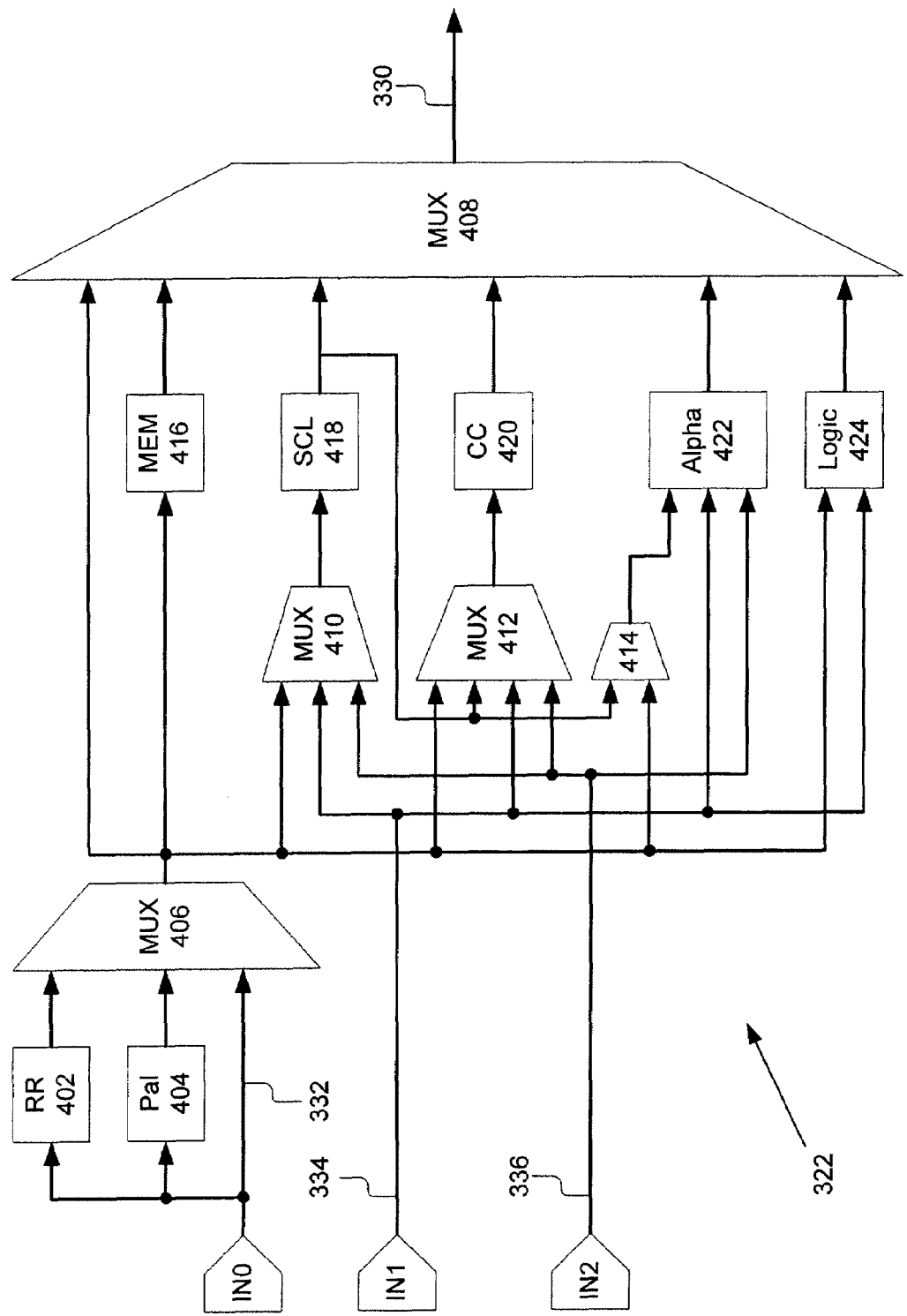
FIG. 4 is a block diagram of an embodiment of combined engine of the present invention.

Referring now to FIG. 4, one embodiment for the blitter engine 322 is shown in more detail. The blitter engine 322 has three input ports, 2 for video/graphics raw data and 1 for dedicated alpha channel. The output of the first input buffer 316 serves as input port 0 and supports various YUV and RGB formats as well as palette and alpha modes. Both progressive and interlaced scan formats are accepted. Input port 0 is the only port that supports WMV9 range reduction and color palette processing. Other features that are supported exclusively by port 0 include memory operations such as memory copy, and rotation and other operations as detailed below in Appendix A. The output of the second input buffer 318 serves as input port 1 and supports YUV and RGB formats only. Both progressive and interlaced scan formats are accepted. Input port 2 supports dedicated alpha and is only valid for progressive scan. The ports and the features they support are detailed below in Appendix A. The output of the blitter engine 322 is provided on line 218 and the output format may be YUV and RGB formats and progressive or interlaced scan modes, depending on input mode and operations.

With the exception of memory operations such as memory copy and rotation, all other features are supported by any of the three input ports. Examples of unary operations supported by any input port are scaling and scan conversion. Operations that require more than one port at the same time include logic functions (which require 2 ports), color conversion (which requires 2 or 3 ports), and alpha blending (requires 3 ports).

Although not shown in FIG. 4, the blitter engine 322 includes various command, parameter and status registers as will be understood to those skilled in the art. The command, parameter and status registers in one embodiment are memory mapped in BLT Address space. The command and control register specifies: 1) operations of the blitter; 2) if the command can be executed right away or has to wait for an external signal (including vSync), and 3) if an interrupt should be issued after the blitter is done, etc. The parameter registers provide: 1) address, offset, size, format of the source and destination buffer; and parameters needed for the operation, such as the scaling, alpha, etc. The status register provides the status of the blitter engine 322 when executing the current command. These registers control the operation of the components of the blitter engine 322 as described below.

Referring now to FIG. 4, the components of the blitter engine 322 are shown in detail. The blitter engine 322 includes a pre-processing pipeline to convert video/graphics data suitable for subsequent processing, and a main execution portion. The pre-processing pipeline has several modes of pre-processing including: range reduction conversion for WMV9, palette lookup if graphics data is in palette mode, and bypass mode. The output of pre-processing is provided by multiplexer 406 and can be used as inputs for subsequent operations in one pass.

The pre-processing pipeline portion of the blitter engine 322 includes a range reduction unit 402, a color palette look up 404 and a multiplexer 406. The range reduction unit 402 has an input and an output. The input of the range reduction unit 402 is coupled by signal line 332 to the output of the first buffer 316 or input port 0. The output of the range reduction unit 402 is coupled to an input of multiplexer 406. The range reduction unit 402 performs range reduction conversion according to the WMV9 standard as will be understood by those skilled in the art. Similarly, the color palette look up 404 has an input and an output, with the input of the color palette look up 404 coupled by signal line 332 to the output of the first buffer 316. The output of the palette look up 404 is coupled to a second input of the multiplexer 406. The color palette look up is used to look up palette values for color conversion as will be understood to those skilled in the art. A third input of the multiplexer 406 is coupled to signal line 332 to receive data from the first input buffer 316. This provides a by-pass path when no pre-processing is performed. The multiplexer 406 also has a control input (not shown) as will be understood by those skilled in the art. The control input is coupled to the output of the registers to set the operational mode of the pre-processing pipeline as one of: 1) no pre-processing mode, 2) range reduction mode or 3) palette look-up mode. The output of multiplexer 406 is coupled to multiple inputs of the main execution portion of the blitter engine 322. In particular, the output of multiplexer 406 is coupled to an input of multiplexer 408, the input of memory execution unit 416, an input of multiplexers 410, 412, and 414 and an input of the logic operations unit 424. This allows the data from input port 0 to be provided to any of the five functional units of the main execution engine or alternatively data that has been pre-processed.

The main execution engine of the blitter engine 322 includes a plurality of multiplexers 408, 410, 412, 414, and five functional units: a memory execution unit 416, a scaler 418, a color conversion unit 420, an alpha blending unit 422 and a logic operation unit 424.

The multiplexer 408 provides the output of the main execution engine, and is preferably a six-to-one multiplexer. The multiplexer 408 has one input coupled to the output of multiplexer 406 and the remaining five inputs coupled to the output of the memory execution unit 416, the scaler 418, the color conversion unit 420, the alpha blending unit 422 and the logic operation unit 424.

The memory execution unit 416 provides memory related functions such as rotation and mirroring. The input of the memory execution unit 416 has an input coupled to the output of the multiplexer 406 to receive data from port 0 or preprocessed data, and has an output coupled to an input of multiplexer 408. For example, in one embodiment, the memory functions are limited to 256-pixels in the horizontal direction.

The scaler 418 performs video scaling, filtering, and scan conversion (de-interlacing). The scaler 418 has an input coupled to the output of multiplexer 410 and an output coupled to an input of multiplexer 408. For example, in one embodiment, the scaling functions are limited to 256-pixels in the horizontal direction. The multiplexer 410 is a three-to-one multiplexer and has an input coupled to input port 1, input port 2 and the output of multiplexer 406. Thus, the multiplexer 410 can provide data from any port 0, 1 or 2 or pre-processed data as input to the scaler 418. The output of the scaler 418 is also provided via multiplexer 412 as an input to the color conversion unit 420. Thus, scaling and color conversion can be performed in one pass.

The color conversion unit 420 has an input and an output, and performs color space conversion. For example, the color conversion can convert from various forms of RGB to YUV and vice versa, The color conversion unit 402 is of a conventional type known to those skilled in the art. The input of the color conversion unit 420 is coupled to the output of the multiplexer 412. The multiplexer 412 is a four-to-one multiplexer and has an input coupled to input port 1, input port 2, the output of multiplexer 406, and the output of the scaler 418. The color conversion unit 420 can perform color conversion on any of these four inputs.

The alpha blending unit 422 has a first, a second and a third input and an output. The alpha blending unit 422 performs alpha blending (a convex combination of two colors allowing for transparency effects in computer graphics) in a conventional manner. The first and second inputs are coupled to receive the first two color values and the third input is coupled to receive the alpha value. The first input is coupled to the output of the multiplexer 414 to receive either the output of the scaler 418 or the output of multiplexer 406 which is input port 0 or preprocessed data from input port 0. The second input is coupled to receive data on input port 1 and the third input is coupled to receive data from input port 2.

The logic operation unit 424 has a first input and a second input and performs a logical operation on the input values. The first input of the logic operation unit 424 is coupled to the output of multiplexer 406 which is input port 0 or preprocessed data from input port 0. The second input of the logic operation unit 424 is coupled to signal line 334 to receive data on input port 1. The logic operation unit 424 performs one of the logic operations described below in Appendix B in response to data stored in the control registers as will be understood to those skilled in the art. The logic operation unit 424 can perform a memory copy when the logic operation unit 424 is configured in bypass mode. The data DMA 314 will be responsible for writing the video/graphics data to the destination buffer.

Figure 5:
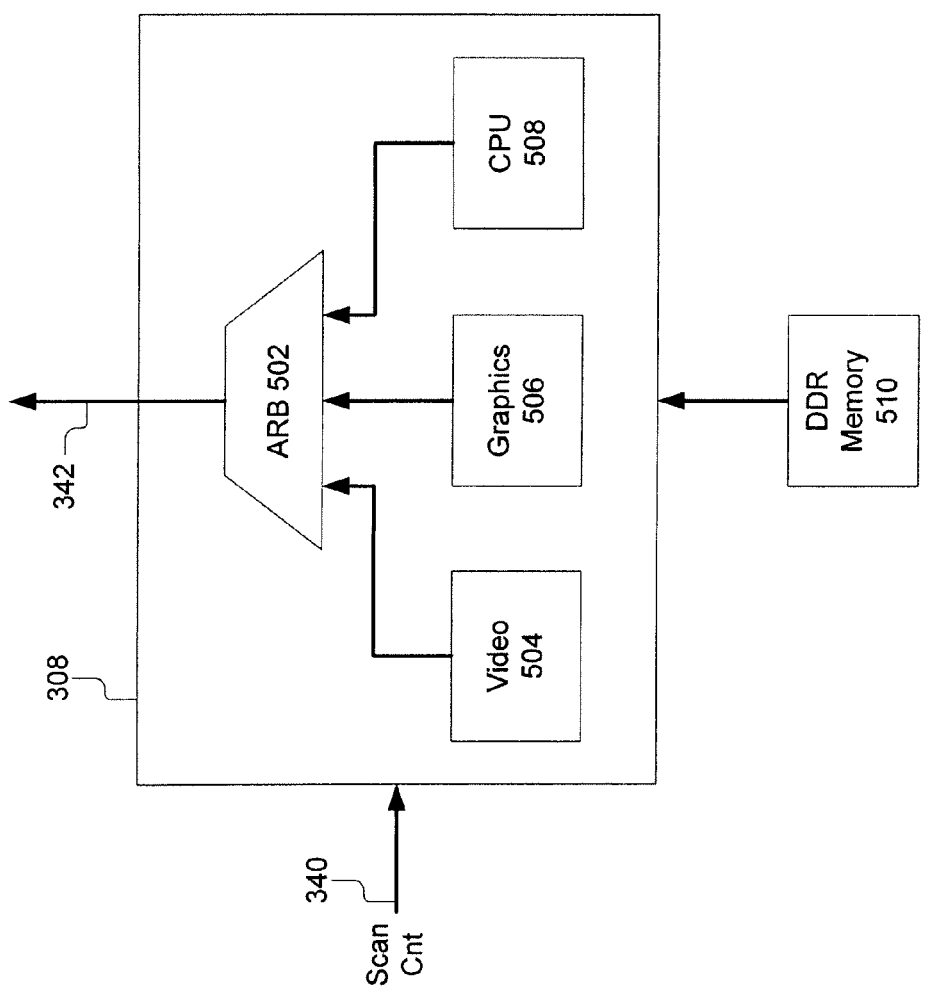
FIG. 5 is a block diagram of one embodiment of an arbiter for a system according to the present invention.

Referring now to FIG. 5, one embodiment of the command DMA 308 is shown. In particular, the command DMA 308 comprises an arbiter 502, a buffer 504 for video commands, a buffer 506 for graphics commands, and a buffer 508 for CPU commands. Each of the buffers 504, 506, 508 is coupled to memory 510 to receive commands and temporarily store them. Each of the buffers 504, 506, 508 is preferably a FIFO buffer. The memory 510 for example may be a double-data-rate synchronous dynamic random access memory. The command DMA 308 is also coupled to signal line 340 to receive a control signal referred to as the scan count. The scan count defines the points at which the arbiter 502 can switch between processing different streams of video, graphics or CPU data. The scan count from display pipeline is used to identify vertical blanking time to schedule commands to process on screen buffer. The arbiter 502 has a plurality of data inputs each coupled to a respective buffer 504, 506, 508. The output of the arbiter 502 is provided on signal line 342 to the parser 304 via buffer 306. The arbiter 502 preferably executes an arbitration scheme between video, graphics and CPU streams. In one embodiment, the CPU always has the highest priority, followed by video and graphics whose priority is programmable on a per-tile basis. In general, video has a higher priority than graphics because it must be provided at 60 frames a second to maintain image quality. The first word in the command is preferably used to indicate the arbitration priority. The arbiter 502 reads the first word from each of the buffers 504, 506, 508 which can be a range of priorities. The arbiter 502 does a comparison of the first words in each buffer 504, 506, 508. The remaining portions of the data stored in the buffers 504, 506, 508 are a command sequence until a terminator is reached. Based on the comparison of the words at the beginning of each buffers 504, 506, 508, the arbiter 502 selects the one with the highest priority and passes the words and their command sequence onto the parser 304. While only the arbitration for the command DMA 308 has been described above, those skilled in the art will recognize that a similar arbitration scheme is implemented in the data DMA 314 to ensure that the data loaded into the input buffers 316, 318 and 320 correspond to the commands applied to the blitter engine 322 via signal line 350.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

APPENDIX A

Features Supported by Blitter Engine

| Features | Port 0 | Port 1 | Port 2 |
|---|---|---|---|
| Input Format | Y/UV422<br>Y/UV420<br>Y/UV420 co-sited<br>Y/UV411 planar<br>ARGB32<br>XRGB32<br>YUV420 RR<br>P8<br>A8 | Y/UV422<br>Y/UV420<br>Y/UV420 co-sited<br>Y/UV411 planar<br>ARGB32<br>XRGB32 | A8 |
| Input Scan | Progressive/<br>Interlaced | Progressive/<br>Interlaced | Progressive |
| Output Format | | Y/UV420<br>ARGB32<br>XRGB32 | |
| Output Scan | | Progressive/<br>Interlaced | |
| Range Reduction | Yes | NA | NA |
| Palette | Yes | NA | NA |
| Memory Copy | Yes | NA | NA |
| | Supports reverse in vertical direction | | |
| Rotation +/−90 | Yes | NA | NA |
| Mirroring | Yes | NA | NA |
| Scaling | Yes | Yes | Yes |
| Scan Conversion | Yes | Yes | Yes |
| Color Conversion | Yes | Yes | Yes |
| | XRGB32 + A −> ARGB32<br>Y + UV + A −> ARGB32<br>ARGB32 −> Y/UV | | |
| Alpha Blending | Yes | Yes | No |
| | ARGB32 + A1RGB32 + Global A −> A1RGB32<br>XRGB32 + A1RGB32 + Global A −> A1RGB32<br>Y/UV + Y/UV + Global A −> Y/UV | | |
| Logic Functions | Yes | Yes | NA |

APPENDIX B

Logic Operations Supported by Blitter Engine

| Operation | Opcode | y = 1 if {x0, x1} ∈ S |
|---|---|---|
| Zero | 1_0000 | {} |
| NOR | 1_0001 | {00} |
| | 1_0010 | {01} |
| | 1_0011 | {10} |
| AND | 1_0100 | {11} |
| ~X0 | 1_0101 | {00, 01} |
| ~X1 | 1_0110 | {00, 10} |
| Xnor | 1_0111 | {00, 11} |
| Xor | 1_1000 | {01, 10} |
| X1 | 1_1001 | {01, 11} |
| X0 | 1_1010 | {10, 11} |
| NAND | 1_1011 | {00, 01, 10} |
| | 1_1100 | {00, 01, 11} |
| | 1_1101 | {00, 10, 11} |
| OR | 1_1110 | {01, 10, 11} |
| One | 1_1111 | {00, 01, 10, 11} |

What is claimed is:

1. A system for processing video and graphics data, comprising:

an arbiter having a first input, a second input, a third input and an output, the arbiter performing prioritization and arbitration between the video, graphics and processor requests, the arbiter outputting data and commands selected from the first input, the second input and the third input of the arbiter; and a combined engine having input ports, a data output and a control input for processing graphics and video data, the combined engine selectively processing either video data or graphics data in response to a signal on the control input of the combined engine, the input ports of the combined engine coupled to the output of the arbiter, wherein the combined engine includes a scaler having an input and an output for performing video scaling, filtering, and scan conversion, the input of the scaler coupled to input ports of the combined engine, and wherein the combined engine includes a color conversion unit having an input and an output for performing color conversion, the input of the color conversion unit coupled to input ports of the combined engine and to the scaler output, enabling one pass scaling and color conversion.

2. The system of claim 1, wherein the combined engine switches between processing different streams of video, graphics, or CPU data when a scan count identifies vertical blanking time.

3. The system of claim 1, wherein the combined engine includes a memory execution unit having inputs and an output for performing mirroring and rotation, the inputs of the memory execution unit coupled to input ports of the combined engine.

* * * * *